(12) United States Patent
Ellis et al.

(10) Patent No.: US 12,286,545 B2
(45) Date of Patent: Apr. 29, 2025

(54) TEXTILE PRINTING FLUID SET CONTAINING A PRETREATMENT AND A MIXTURE OF PIGMENT AND DISPERSE DYE

(71) Applicant: DuPont Electronics, Inc., Wilmington, DE (US)

(72) Inventors: Scott W. Ellis, Wilmington, DE (US); Xiaoqing Li, Newark, DE (US); Jue Liang, Glen Mills, PA (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 987 days.

(21) Appl. No.: 17/414,524

(22) PCT Filed: Dec. 17, 2019

(86) PCT No.: PCT/US2019/066843
§ 371 (c)(1),
(2) Date: Jun. 16, 2021

(87) PCT Pub. No.: WO2020/131865
PCT Pub. Date: Jun. 25, 2020

(65) Prior Publication Data
US 2022/0064473 A1 Mar. 3, 2022

Related U.S. Application Data

(60) Provisional application No. 62/781,917, filed on Dec. 19, 2018.

(51) Int. Cl.
| | | |
|---|---|---|
| *C09D 11/54* | (2014.01) |
| *B41J 3/407* | (2006.01) |
| *B41M 5/00* | (2006.01) |
| *C09D 11/033* | (2014.01) |
| *C09D 11/037* | (2014.01) |
| *C09D 11/102* | (2014.01) |
| *C09D 11/322* | (2014.01) |
| *C09D 11/328* | (2014.01) |
| *D06P 1/52* | (2006.01) |
| *D06P 5/00* | (2006.01) |
| *D06P 5/30* | (2006.01) |

(52) U.S. Cl.
CPC ............ *C09D 11/54* (2013.01); *B41J 3/4078* (2013.01); *B41M 5/0023* (2013.01); *C09D 11/033* (2013.01); *C09D 11/037* (2013.01); *C09D 11/102* (2013.01); *C09D 11/322* (2013.01); *C09D 11/328* (2013.01); *D06P 1/5285* (2013.01); *D06P 5/002* (2013.01); *D06P 5/30* (2013.01)

(58) Field of Classification Search
CPC ..... C09D 11/54; C09D 11/033; C09D 11/037; C09D 11/102; C09D 11/322; C09D 11/328; B41J 3/4078; B41M 5/0023; D06P 1/5285; D06P 5/002; D06P 5/30; D06P 1/16; D06P 1/44; D06P 1/5221; D06P 1/5228; D06P 1/5257
See application file for complete search history.

(56) References Cited

U.S. PATENT DOCUMENTS

| | | |
|---|---|---|
| 4,597,794 A | 7/1986 | Ohta et al. |
| 5,085,698 A | 2/1992 | Ma et al. |
| 5,231,131 A | 7/1993 | Chu et al. |
| 5,272,201 A | 12/1993 | Ma et al. |
| 5,506,295 A * | 4/1996 | Kado ................. C09D 11/30 526/260 |
| 5,554,739 A | 9/1996 | Belmont |
| 6,117,921 A | 9/2000 | Ma et al. |
| 6,262,152 B1 | 7/2001 | Fryd et al. |
| 6,306,994 B1 | 10/2001 | Donald et al. |
| 6,433,117 B1 | 8/2002 | Ma et al. |
| 6,852,156 B2 | 2/2005 | Yeh et al. |
| 2003/0126246 A1 | 7/2003 | Redding et al. |
| 2005/0182154 A1 | 8/2005 | Berge et al. |
| 2006/0225227 A1 | 10/2006 | Luttringer et al. |
| 2010/0302326 A1* | 12/2010 | Morohoshi ........... B41J 2/1606 347/105 |
| 2012/0214939 A1 | 8/2012 | Li et al. |
| 2017/0058453 A1* | 3/2017 | Pan ..................... D06P 5/2072 |
| 2018/0215939 A1* | 8/2018 | Mizuno ................ C09D 11/40 |
| 2018/0265728 A1* | 9/2018 | Hanazawa ............ C08K 3/30 |
| 2018/0282567 A1* | 10/2018 | Ishida .................. D06P 1/6424 |
| 2019/0016911 A1* | 1/2019 | Okamoto ............... B41M 5/00 |
| 2019/0300734 A1* | 10/2019 | Taniguchi ............. C09D 11/40 |
| 2020/0061997 A1* | 2/2020 | Kagata ................ B41J 2/0451 |

(Continued)

FOREIGN PATENT DOCUMENTS

| | | |
|---|---|---|
| EP | 0556649 A1 | 8/1993 |
| JP | 2001315425 A * | 11/2001 |

(Continued)

OTHER PUBLICATIONS

English machine translation of JP-2017222833-A (Year: 2017).*
English machine translation of JP-2001315425-A (Year: 2003).*
PCT International Search Report for Application No. PCT/US2019/066843; Blas, Valerie, Authorized Officer; ISA/EPO; Apr. 8, 2020.

*Primary Examiner* — Jennifer A Smith
*Assistant Examiner* — Jeffrey Eugene Barzach

(57) ABSTRACT

The present disclosure provides a fluid set for printing on textile. The fluid set contains a pretreatment composition, and a mixture of a pigment and a disperse dye as the colorant. The blending of a pigment with a disperse dye as the colorant together with a suitable pretreatment composition provides better image quality.

9 Claims, No Drawings

(56) References Cited

U.S. PATENT DOCUMENTS

| | | | |
|---|---|---|---|
| 2020/0087527 A1* | 3/2020 | Okuda | B41J 2/2117 |
| 2020/0115576 A1* | 4/2020 | Kodama | D06P 5/30 |
| 2020/0180337 A1* | 6/2020 | Ushiku | B41J 2/01 |

FOREIGN PATENT DOCUMENTS

| | | | | |
|---|---|---|---|---|
| JP | 2017222833 A | * | 12/2017 | B41M 5/0017 |
| WO | 2015094564 A1 | | 6/2015 | |
| WO | 2018137993 A1 | | 8/2018 | |

\* cited by examiner

TEXTILE PRINTING FLUID SET CONTAINING A PRETREATMENT AND A MIXTURE OF PIGMENT AND DISPERSE DYE

CROSS REFERENCE TO RELATED APPLICATIONS

This application claims priority under 35 U.S.C. § 119 from U.S. Provisional Application Ser. No. 62/781,917, filed Dec. 19, 2018.

BACKGROUND OF THE DISCLOSURE

This disclosure relates to pretreating a textile substrate and printing on the textile substrate a mixture of a pigment and a disperse dye.

Ink-jet digital printing method is becoming increasingly important for the printing of textiles. It offers a number of potential benefits over conventional printing methods such as screen printing. Digital printing eliminates the set-up expense associated with screen preparation and can potentially enable cost-effective short run production. Digital printing furthermore allows visual effects, such as tonal gradients and repeat of printed patterns that cannot be practically achieved with a screen printing process. Especially beneficial is the ease in changing the patterns of originals during production of digital printing, when it is possible to respond to a change in patterns or other requirements within a short period of time.

Disperse dye inks are the most commonly known type of digital textile inks. Typically, a dye-sublimation process takes place, and the disperse dye inks infuse into and dye the fabric, becoming part of the textile itself. Disperse dyes are traditionally non-ionic chemicals with sparing solubility in water. Consequently, disperse dyes are able to retain well for hydrophobic fibers such as polyester, nylon, acetate, polyester blends, and other synthetic textiles, but retain poorly for natural fibers such as cotton, silk, and wool.

Compared to dyes, pigments do not have a real affinity for specific fibers, which makes them suitable for coloring on the top layer of a variety of fibers as well as blends. However, printing on a textile substrate using a pigment has traditionally been providing lower color than using other dye colorants. U.S. Patent Application Publication No. 20050182154 discloses an inkjet ink containing cross-linked polyurethanes as a binder for printing on textile.

U.S. Patent Application Publication No. 2006225227 discloses a composition comprising at least one nickel complex pigment and at least one disperse dye to be used in printing pastes and dye baths.

One difficult criterion for effective industrial digital printing on textiles is the large numbers of different textile substrates ranging from natural such as cotton, wool or silk to synthetic materials like polyester and blended fabrics. All these different fabric types require different types of inks in addition to different needs for pre- and post-treatment as well as processing. A need exists for ink-jet inks that can be printed on various textile substrates to form durable, high quality image. The present disclosure satisfies this need by providing ink compositions containing a blend of a disperse dye and pigment as a colorant, and a polymeric binder, to be used together with a pretreatment composition for printing on textiles.

SUMMARY OF THE DISCLOSURE

An embodiment of the present disclosure provides an inkjet printing fluid set for printing on textile, the fluid set comprising: a) an aqueous pretreatment composition comprising an ink-aggregating agent, wherein said ink-aggregating agent is one or more members selected from a cationic polymer, a multivalent metal salt, an organic acid, and mixtures thereof; and b) an aqueous inkjet ink comprising a colorant and a first polymeric binder, wherein the colorant is a mixture of a pigment and a disperse dye, and the first polymeric binder is one or more members selected from the group consisting of polyester polyol based waterborne polyurethane, polycarbonate polyol based waterborne polyurethane, polyester-carbonate polyol based waterborne polyurethane, acrylic emulsion polymer, styrene acrylic emulsion polymer, vinyl acetate-ethylene copolymer dispersion, and mixtures thereof.

Another embodiment provides that the first polymeric binder in b) is a polyester polyol based waterborne polyurethane.

Another embodiment provides that the aqueous pretreatment composition in a) further comprises a second polymeric binder.

Another embodiment provides that the second polymeric binder is a non-ionic polymer.

Another embodiment provides that the aqueous inkjet ink further comprises a dispersant for the colorant.

Another embodiment provides that the colorant is a self-dispersing pigment.

Another embodiment provides that the aqueous inkjet ink further comprises a dispersant for the colorant, and said dispersant is different from said first polymeric binder in b) and said second polymeric binder in a).

Another embodiment provides that the disperse dye is selected from the group consisting of Disperse Blue 359, Disperse Red 60, Disperse Yellow 54, Disperse Blue 360, Disperse Yellow 54, and Disperse Brown 27.

Another embodiment provides that a method of digital printing a textile fabric comprising:
 a) providing a textile substrate;
 b) applying a pretreatment composition comprising an ink-aggregating agent, wherein said ink-aggregating agent is one or more members selected from a cationic polymer, a multivalent metal salt, an organic acid and mixtures thereof; and
 c) jetting an aqueous inkjet ink onto the textile substrate; wherein said aqueous inkjet ink comprises a colorant and a first polymeric binder, and said colorant is a mixture of a pigment and a disperse dye.

Yet another embodiment provides that the first polymeric binder in the method above is one or more members selected from the group consisting of polyester polyol based waterborne polyurethane, polycarbonate polyol based waterborne polyurethane, polyester-carbonate polyol based waterborne polyurethane, acrylic emulsion polymer, styrene acrylic emulsion polymer, vinyl acetate-ethylene copolymer dispersion, and mixtures thereof.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two-phase system where one phase consists of finely divided particles (often in the colloidal size range) distributed throughout a bulk substance, of the particles being the disperse or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the term "ionizable groups," means potentially ionic groups.

As used herein, the term "substantially" means being of considerable degree, almost all.

As used herein, the term "MW" means weight average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term 'NCO" means isocyanate.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit. As used herein, the term "psig" means pounds square inch gauge, a pressure unit that does not include air pressure.

As used herein, the term "prepolymer" means the polymer that is an intermediate in a polymerization process, and can be considered a polymer.

As used herein, the term "AN" means acid number, mg KOH/gram of solid polymer.

As used herein, the term "PUD" means the polyurethanes dispersions described herein.

As used herein, the term "DTG" means direct to garment.

As used herein, the term "BMEA" means bis(methoxyethyl)amine.

As used herein, the term "DBTDL" means dibutyltin dilaurate.

As used herein, the term "DMPA" means dimethylol propionic acid.

As used herein, the term "IPDI" means isophorone diisocyanate.

As used herein, the term "NMP" means n-Methyl pyrolidone.

As used herein, the term "TEB" means triethylene glycol monobutyl ether, a reagent supplied by Dow Chemical.

As used herein, the term "Sulfolane" means tetramethylene sulfone.

As used herein, Terathane® 650 is a polyether diol from Invista, Wichita, KS.

As used herein, the term "EDA" means ethylene diamine.

As used herein, the term "TEA" means triethylamine.

As used herein, the term "DEA" means diethanolamine.

As used herein, the term "DMPA" means dimethylol propionic acid.

As used herein, the term "MDEA" means methyl diethanol amine.

As used herein, the term "TETA" means triethylenetetramine.

As used herein, the term "THF" means tetrahydrofuran.

As used herein, the term "TRB-2" means Dainichiseika® TRB-2, a cyan pigment.

As used herein, the term "Y74" means Yellow 74, a yellow pigment supplied by Sun Chemical.

As used herein, Denacol® 321 is trimethylolpropane polyglycidyl ether, a cross-linking reagent from Nagase Chemicals Ltd., Osaka, Japan.

As used herein, Desmophen® C1200 is a polyester carbonate diol from Covestro (Pittsburgh, PA).

As used herein, Surfynol® 440 is a nonionic surfactant from Air Products (Allentown, PA).

As used herein, Terathane® 1400 is a polytetramethylene oxide polyol from Invista (Witchita, KA).

As used herein, Eleminol JS-20 is a polymerizable surfactant from Sanyo Chemical Industries (Koyoto, Japan).

As used herein, Polystep B-1 is anionic surfactant from Stepan (Chicago, IL).

As used herein, Artistri® P5010 is a fabric pretreatment solution from DuPont (Wilmington, DE).

Unless otherwise noted, the above chemicals were obtained from Aldrich (Milwaukee, WI) or other similar suppliers of laboratory chemicals.

In addition, references in the singular may also include the plural (for example, "a" and "an" may refer to one, or one or more) unless the context specifically states otherwise.

Colorants

Suitable colorants of the present disclosure are mixtures of disperse dye(s) and pigment(s).

Suitable disperse dyes of the present disclosure are dyes which are sublimated or evaporated at 70 to 260° C. under atmospheric pressure. Examples include: azo, anthraquinone, quinophthalone, styryl, oxazine, xanthene, methine, and azomethine dyes. Among these dyes, examples of a yellow disperse dye include "C. I. Disperse Yellow 51", 54, 60, 64, 65, 71, 82, 98, 114, 119, 160, 201 and 211. Examples of an orange disperse dye include "C. I. Disperse Orange 25", 33, 44, and 288. Examples of a red disperse dye include "C. I. Disperse Red 4", 22, 55, 59, 60, 73, 86, 91, 146, 152, 191, 302, and 364. Examples of a blue disperse dye include "C. I. Disperse Blue 14", 28, 56, 60, 72, 73, 77, 334, 359, 360 and 366. Other color components are, e.g., "C. I. Disperse Brown 27"; "CI. Disperse Violet 26", 27, 28; and the like.

Among these, "C. I. Disperse Yellow 54", 60, 64, 71, 82; "C. I. Disperse Orange 25", 288; "C. I. Disperse Red 4", 22, 55, 60, 146, 302, 364; "C. I. Disperse Blue 14", 28, 56, 72, 334, 359, 360; "C. I. Disperse Violet 28"; and "C. I. Disperse Brown 27" are preferred.

The above disperse dyes may be in a powder or lump dry state or in a wet cake or slurry state, otherwise may contain a small amount of a dispersing agent such as surfactant for the purpose to suppress dye particle aggregations during and after dye synthesis. These commercially available dyes have grades for industrial dyeing, ink for coloring resin, inkjet and the like, as well as differences in production method, purity, particle size of dye and the like.

The term "pigment" as used herein means an insoluble colorant that requires to be disperse with a dispersant and processed under dispersive conditions in the presence of a dispersant. The dispersion process results in a stable disperse pigment. The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698. Some examples of pigments with coloristic properties useful in ink-jet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

Both colorants, disperse dye and pigments, alone or in combination, may be dispersed with a polymeric dispersant to prepare an ink, especially an ink-jet ink. The colorant particles are sufficiently small to permit free flow of the ink through the ink-jet printing device, especially at the ejecting nozzles that usually have a diameter ranging from about 10 micron to about 50 micron. The particle size also has an influence on the colorant dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the colorant particle size should range from about 0.005 to about 5 micron and, most typically, from about 0.005 to about 1 micron. The average particle size as measured by dynamic light scattering is less than about 500 nm, typically less than about 300 nm.

The pigment of the present disclosure can also be a self-dispersing (or self-dispersible) pigment. The term self-dispersing pigment (or "SDP") refers to pigment particles whose surface has been chemically modified with hydrophilic, dispersability-imparting groups that allow the pigment to be stably disperse in an aqueous vehicle without a separate dispersant. "Stably disperse" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when disperse in aqueous vehicle. The carboxylate or sulfonate groups are usually associated with monovalent and/or divalent cationic counter-ions. Methods of making SDPs are well known and can be found, for example, in U.S. Pat. Nos. 5,554,739 and 6,852,156.

The SDPs may be black, such as those based on carbon black, or may be colored pigments. Examples of pigments with coloristic properties useful in ink-jet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C.I." designations established by Society Dyers and Colourists, Bradford, Yorkshire, UK and published in *The Color Index*, Third Edition, 1971.

The SDPs of the present disclosure may have a degree of functionalization wherein the density of anionic groups is less than about 3.5 moles per square meter of pigment surface (3.5 $\mu mol/m^2$), and more specifically, less than about 3.0 $\mu mol/m^2$. Degrees of functionalization of less than about 1.8 $\mu mol/m^2$, and more specifically, less than about 1.5 $\mu mol/m^2$, are also suitable and may be preferred for certain specific types of SDPs. The range of useful particle size after dispersion is typically from about 0.005 um to about 15 um. Typically, the pigment particle size should range from about 0.005 um to about 5 um; and, specifically, from about 0.005 um to about 1 um. The average particle size as measured by dynamic light scattering is less than about 500 nm, typically less than about 300 nm.

The amount of colorant present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

The weight ratio of disperse dye to pigment is from 1:20 to 20:1. More typically, the ratio of disperse dye to pigment is from 1:10 to 10:1. Most typically, the ratio of disperse dye to pigment is from 1:5 to 5:1.

Polymeric Dispersant, for Colorant

The polymeric dispersant for colorant may be a random or a structured polymer. Typically, the polymer dispersant is a copolymer of hydrophobic and hydrophilic monomers. The "random polymer" means polymers where molecules of each monomer are randomly arranged in the polymer backbone. For a reference on suitable random polymeric dispersants, see: U.S. Pat. No. 4,597,794. The "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. Nos. 6,117,921, 6,262,152, 6,306,994 and 6,433,117.

The "random polymer" also includes polyurethanes. Particularly useful are the polyurethane dispersant disclosed in U.S. Patent Application Publication No. 2012/0214939 where the polyurethane dispersant is crosslinked after dispersing a pigment to form a pigment dispersion.

Other "random polymer" suitable for dispersing disperse dye is not particularly limited, examples include formaldehyde condensates of creosote oil sulfonic acid, formaldehyde condensates of aromatic sulfonic acids, formaldehyde condensates of lignin sulfonic acid, and their sodium salts and the like, and styrene-(meth)acrylic acid-based copolymer, and polyurethane dispersants.

Preparation of Colorant Dispersions

The colorant dispersions used in this invention can be prepared using any conventional milling process known in the art. Most milling processes use a two-step process involving a first mixing step followed by a second grinding step. The first step comprises mixing of all the ingredients, that is, colorants, dispersants, liquid carriers, neutralizing agent and any optional additives to provide a blended "premix". Typically, all liquid ingredients are added first, followed by the dispersants, and lastly the colorant. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 120 minutes.

The second step comprises grinding of the premix to produce a colorant dispersion. Typically, grinding involves a media milling process, although other milling techniques can also be used. In the present invention, a lab-scale Eiger Minimill (Model M250, VSE EXP) manufactured by Eiger Machinery Inc., Chicago, Illinois is employed. Grinding was accomplished by charging about 820 grams of 0.5 YTZ® zirconia media to the mill. The mill disk is operated at a speed between 2000 rpm and 4000 rpm, and typically between 3000 rpm and 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention are subjected to a total of 4 hours of milling.

For black pigment dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black pigment dispersions in the Examples, a lab-scale (Model M-110Y, available from Microfluidics of Newton, Massachusetts) high pressure pneumatic Microfluidizer with a diamond Z Chamber was employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

The range of useful particle size of the above colorant dispersion is typically from about 0.005 um to about 15 um. Typically, the particle size should range from about 0.005 um to about 5 um; and, specifically, from about 0.005 um to about 1 um. The average particle size as measured by dynamic light scattering is less than about 500 nm, typically less than about 300 nm.

Polymeric Binder 1, for Ink

A binder is a polymeric compound or a mixture of polymeric compounds that is added to an ink formulation. The binder can impart properties to the printed material that, for example, gives greater durability to the printed material. Typical polymers used as binders in inkjet inks include polyurethane dispersions and polyurethane solutions, acrylics, styrene acrylics, styrene butadienes, styrene butadiene acrylonitriles, neoprenes, ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups. Alternatively, the binder may be stabilized by external surfactants. The binder can be used singly or in combination with other binders. The binder is typically present in an ink in an amount of at least 0.2% by weight based on the total weight of the ink. Typically, a binder is different from dye and pigment dispersant described above. The binder is typically added to an ink during the final formulation stage, not during the preparation of a pigment dispersion.

The preferred binder is miscible with disperse dye. Disperse dye molecule should be able to dissolve into the preferred binder matrix in the molecular level to exhibit bright color and durability. The preferred binders interacting strongly with disperse dye are polyester polyol based waterborne polyurethane, polycarbonate polyol based waterborne polyurethane, polyester-carbonate polyol based waterborne polyurethane, acrylic emulsion polymer, styrene acrylic emulsion polymer, and vinyl acetate-ethylene copolymer dispersions.

Ink Vehicle

The ink of the present disclosure comprises an ink vehicle, typically an aqueous ink vehicle, also known as aqueous vehicle or aqueous carrier medium.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are C4-C6 alkanediols with 1,2-hexanediol being most typical. Suitable surfactants include ethoxylated acetylene diols (e.g., Surfynol® series commercially available from Air Products), ethoxylated alkyl primary alcohols (e.g., Neodol® series commercially available from Shell) and secondary alcohols (e.g., Tergitol® series commercially available from Union Carbide), sulfosuccinates (e.g., Aerosol® series commercially available from Cytec), organosilicones (e.g., Silwet® series commercially available from Witco) and fluoro surfactants (e.g., Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Although not restricted to any particular viscosity range or printhead, the inks of the disclosure are particularly suited to lower viscosity applications. Thus the viscosity (at 25° C.) of the inks of this disclosure may be less than about 15 mPa·s, or less than about 12 mPa·s, and even more advantageously, less than about 10 mPa·s.

Other Ingredients

Other ingredients, additives, may be formulated into the ink-jet ink, to the extent that such other ingredients do not interfere with the stability and jettability of the ink-jet ink. This may be readily determined by routine experimentation by one skilled in the art.

Surfactants are commonly added to inks to adjust surface tension and wetting properties. Suitable surfactants include the ones disclosed in the Vehicle section above. For example, anionic, non-ionic, cationic or amphoteric surfactants may be used. Surfactants are typically used in amounts up to about 5% and more typically in amounts up to 3% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The pH of an ink is typically greater than 7, and can be adjusted by bases including amines, alkalines or alkali hydroxides, and other commonly used pH adjusting agents. One skill in the art can readily select a suitable pH adjusting agent that is compatible with other ingredients in an ink.

Co-solvents, such as those exemplified in U.S. Pat. No. 5,272,201 (incorporated by reference herein for all purposes as if fully set forth) may be included to improve pluggage inhibition properties of the ink composition.

Certain reagents can be used as additives to an ink-jet ink to effect post printing curing. Post printing curing is often facilitated by heating of the sample after it is printed. Example of suitable post printing curing agents include amide and amine-formaldehyde resin, phenolic resins, urea resins and blocked polyisocyanate. The selected post printing curing agent should be soluble or dispersible in an ink. Inks containing selected post printing curing agents are stable in storage, which means no curing reaction took place before printing. Only after the ink is printed and when the printed image is fused with heat and optionally pressure, that the post printing curing agent undergoes chemical reaction with the binder, dispersant, ink vehicle, substrate, etc. A specific example of post printing curing agent is Cymel® 303 ULF, from Cytec, West Patterson, NJ.

Biocides may be used to inhibit growth of microorganisms.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Ink Sets

The term "ink set" refers to all the individual inks or other fluids an ink-jet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The black, magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. These "gamut-expanding" inks are particularly useful in textile printing for simulating the color gamut of analog screen printing, such as disclosed in U.S. Patent Application Publication No. 20030128246.

Substrate

The present embodiments are particularly advantageous for ink-jet printing on natural and synthetic fabrics, and various blends thereof. Examples of the natural fabrics include cotton, silk, and wools. Examples of synthetic fabrics include polyester, nylon, Nomax®, and Kevlar®. These types of fabric are commonly pretreated prior to printing.

Pretreatment Solution

The pretreatment solution used in the present invention is an aqueous composition containing an ink-aggregating agent. Suitable ink-aggregating agents include cationic polymers, multivalent metal salts, organic acids, and mixtures thereof. Examples of pretreatment solutions include DuPont™ Artistri® 5001, 5002, 5003 and 5010 series. Upon printing of an ink of the present disclosure on a fabric pretreated by a pretreatment solution of the present disclosure, the ink-aggregating agent in the pretreatment solution causes aggregation, or "crashing", of the colorant in the ink.

Cationic Polymers

The cationic polymers and copolymers in the pretreatment composition attract and fix oppositely charged anionic colorant dispersion and anionic binder molecules to the substrates. There are a greater variety of molecular structures in the cationic family than in any of the others. Such cationic resins may incorporate charge groups in the main polymer backbones, or as side groups in the polymer chains, generally containing quaternary ammonium groups so that the formal positive charge is present irrespective of the pH level. Cationic polymers have also been synthesized which contain sulphonium or phosphonium groups. Weak electrolyte versions are in use which acquire cationic properties in acidic media and are based on polyamines containing primary, secondary or tertiary amino groups, or mixtures of them. The preparative techniques cover polymerizations by chain growth and step growth mechanisms, often in simple aqueous solutions, but also as water-in-oil emulsions, and the modification of existing polymers.

The cationic polymers for use in the pretreatment coating may include, but are not limited to, polymers and copolymers of diallyldialkyammonium monomers such as diallyldimethylammonium chloride, such as polydiallyldimethylammonium chloride (PDADMAC); polymer and copolymers of cationic acrylate and acrylamide such as polyacryloxyethyldimethylammonium chloride or polyacrylamidoethyldimethylammonium chloride; polymers and copolymers of quarternized vinylpyridine such as polymethyl vinylpyridine chloride; polyalkylamine and quaternary ammonium polymers and copolymers; linear and branched polyethyleneimine; polyvinylamine; and polymers and copolymer derived from epichlorohydrin such as epihalohydrin-amine polymers, FLOQUAT® FL2650 of SNF Inc., of France and KYMENE® 557 LX polymers of Ashland Inc, of Wilmington, Del. Co-monomers in such systems may consist of ones which modify the flexibility, hydrophobicity, or mechanical properties of the polymer molecule. In addition, reactive and/or self-condensing monomers may be included to enhance adhesion to the substrate.

There are also naturally occurring polymers that have inherent cationic properties or the polymer can be modified to yield a cationic polyelectrolyte. The most prominent of these is chitosan. Other examples include cationic starch, cationic polymer modified kraft lignin and cationic grafted amylopectin, guar gum and polysaccharides.

Multivalent Cation Salts

The pretreatments of this invention comprise one or more multivalent cations. The effective amounts needed in a particular situation can vary, and some adjustment, as provided for herein, will generally be necessary.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as $Z^x$. The multivalent cations are substantially soluble in the aqueous pretreatment solution and preferably exist (in solution) in a substantially ionized state so that they are in a form where they are free and available to interact with non-porous or low porous media when the media is exposed to the pretreatment solution.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In another embodiment, the multivalent cation comprises at least one of Ca, Ba, Ru, Co, Zn and Ga. In yet another embodiment, the multivalent cation comprises at least one of Ca, Ba, Ru, Co, Zn and Ga. Preferably the multivalent cation is Ca.

Zx can be incorporated into pretreatment solution by addition in a salt form or by addition in an alkaline form and used as a base in the adjustment of the pretreatment solution pH.

The associated anionic material can be chosen from any common anionic material, especially halides, nitrates and sulfates. The anionic form is chosen so that the multivalent cation is soluble in the aqueous pretreatment solution. The multivalent cationic salts can be used in their hydrated form.

For Ca, the preferred multivalent cation salts are calcium chloride, calcium nitrate, calcium nitrate hydrate and mixtures thereof.

Organic Acids

The pretreatment composition also includes a water soluble (desirably water soluble at concentrations of 10 g/l or more, more desirably 25 g/l or more, and preferably 50 g/l or more at 25° C.) organic acid component such as carboxylic acids, their derivatives, and combination thereof. The function of the water soluble organic acid is to help coagulate anionic colloidally stabilized inks applied over the pretreatment. The organic acid can have one or more carboxylic acid groups. The carboxylic acid generally has from 1 to 20 carbon atoms, and more preferably from 1 to 10 carbon atoms. Preferred organic acids include formic, acetic, citric, tartaric, itaconic, and oxalic acids.

The pretreatment solution can further comprise a Polymeric Binder 2. The Polymeric Binder 2 acts as a bonding/binding agent (binder) by forming a film or a layer upon application, optionally upon drying and chemically curing/crosslinking to itself or via a crosslinking agent thereof on a surface. As known in the art, the binder undergoes a chemical or physical transition upon application. The chemical or physical transition may be setting, drying, heating, curing, crosslinking and the likes. Polymeric Binder 2 is not an ink-aggregating agent.

A preferred Polymeric Binder 2 is a non-ionic polymer. The non-ionic polymer/ink-aggregating agent solution thus formed must be stable as a solution or as a stable emulsion to permit the treatment of coated media. If the non-ionic polymer gels, or its emulsion precipitates in the presence of an ink-aggregating agent, e.g., a multivalent cationic salt solution, then it cannot be used as a pretreatment additive. A screening test to determine whether non-ionic polymer is stable in the presence of an ink-aggregating agent is to mix a 10 wt % polymer (on a dry basis) and a 15 wt % of calcium nitrate tetrahydrate and observe whether the solution/emulsion is stable. The stability is observed at ambient temperature (~25° C.), and at 10 minutes and 24 hours. The non-ionic polymer component must lead to a stable non-ionic polymer/multivalent cationic solution/emulsion mixture.

Some suitable compatible non-ionic polymeric binders include, for example, non-ionic water soluble polymer(s) based on acrylic, urethane, polyester, polyamide, polyvinyl, polyether, polyamine and cellulosic structures, or disperse polymer(s) which include acrylic latexes, polyurethane dispersions, vinyl acetate copolymer latexes, polyester and polyamide dispersions. These polymers may be made by any known process including, but not limited to, free radical, group transfer, ionic, RAFT, condensation and other types of polymerization.

A non-ionic polymer can be formed from the incorporation of a nonionic stabilizer either chemically bound or physically absorbed into the polymer. Examples of nonionic reactive components include, ethylene oxide derivatives, acrylamide, hydroxyethyl-substituted monomers, vinylpyrrolidone, ethyleneimines, and the like. The incorporation can occur during the polymerization step, or after the polymerization step which prepares the latex polymer. In the case of an ethylene oxide nonionic component, the substitution can take the form of incorporating a glycol with sufficient $(-CH_2-CH_2O-)_n$ units to impart the nonionic stability. For instance, a polyurethane may have an alkyl polyethylene glycol incorporated into the nonionic polyurethane. The nonionic component can be the main component in nonionic latex polymer, as long as its properties satisfy the stability test described above.

The nonionic latex polymer may also have ionic components incorporated into the polymer. By example, for the polyurethanes ionic components such as acids may be used in the polyurethane reaction and a specific acid example is dimethylolpropionic acid. For the acylamide and hydroxyethyl substituted nonionic latex polymer, the ionic source can be from (meth)acrylic acids. There are limits to the amount of ionic components in the nonionic latex polymer, since the ionic components may complex with the ink-aggregating agent that will lead to instability of the nonionic latex polymer/multivalent cationic solution. The balance of nonionic and ionic components must lead to a stable solution as described above.

When present, the non-ionic polymer is advantageously used at levels, based on the total weight of ink, of at least about 0.3%, and typically at least about 0.6%. Upper limits are dictated by pre-treatment fluid viscosity or other physical limitations. In a more typical embodiment, no more than about 50% non-ionic polymer is present in the pre-treatment composition, and even most typically no more than about 45%, based on the total weight of the pre-treatment fluid.

The pretreatment solution should comprise sufficient amount of the ink-aggregating agent to provide adequate coating of the textile substrate with the ink-aggregating agent. Typically, the pretreatment solution will comprise at least about 5 wt % of the ink-aggregating agent. Preferably, the pretreatment will comprise from about 8 wt % to about 70 wt % of the ink-aggregating agent, and more preferably up to about 45 wt %. The weight basis of the ink-aggregating agent is based on the total weight of the pretreatment solution.

Application of the pretreatment to the fabric can be any convenient method, such methods also being generally well known to those of ordinary skill in the relevant art. One example of a preferred pretreatment application method is referred to as padding. In padding, a fabric is dipped in the pretreatment solution, then the saturated fabric is passed through nip rollers that squeeze out the excess solution. The amount of solution retained in the fabric can be regulated by the nip pressure applied by the rollers. Other pretreatment techniques include spray application where the solution is applied by spraying on the face or face and back of the fabric, and jetting application where the solution is jetted from an inkjet printhead.

The following examples illustrate the present disclosure without, however, being limited thereto.

EXAMPLES

The invention is further illustrated by, but not limited to, the following examples, in which parts and percentages are by weight unless otherwise noted.

Polymer Binder 1, for Ink

Comparative Polymer, a Polyether Based Polyurethane Polymer

To a dry, alkali- and acid-free flask, equipped with an addition funnel, a condenser, stirrer and a nitrogen gas line were added 843 g of Terathane® 1400, a polyether diol from Invista, 400 g acetone of and 0.06 g of DBTL. The mixture was heated to 40° C. and thoroughly mixed. To the mixture was added 275 g of IPDI via the addition funnel at 40° C. over 60 min, and any residual IPDI was rinsed from the addition funnel into the flask with 10 g of acetone.

The flask temperature was raised to 50° C., held for 30 minutes, followed by addition of 57 g of DMPA, and then 34 g of TEA, to the flask via the addition funnel, which was rinsed with 10 g of acetone. The flask temperature was raised again to 50° C. and held at 50° C. until NCO % was 1.23% or less.

With the temperature at 50° C., 2390 g of deionized (DI) water was added over 10 minutes, followed by 82 g of TETA (as a 10% solution in water) over 5 minutes, via the addition funnel, which was then rinsed with 80.0 g of water. The mixture was held at 50° C. for 1 hr, and then cooled to room temperature.

Acetone (~423.0 g) was removed under vacuum, leaving a final dispersion of polyurethane with about 35.0% solids by weight.

Polymer A

Polymer A was prepared according to the same procedure disclosed under "Polyurethane Dispersoid (PUD EX 1)" in U.S. Patent Application Publication No. 2005/0215663, which is incorporated by reference herein for all purposes as if fully set forth.

Polymer B, a Styrene Acrylic Emulsion

To a dry, alkali- and acid-free reaction flask, equipped with two addition funnels, a condenser, stirrer and a nitrogen gas line were added 6.9 g of Eleminol JS-20, 4.9 g of Polystep B-1 and 1249 g of de-ionized water. Then mixture was agitated and heated to 88° C. while purged with nitrogen. Separately, a monomer mix consisting of 61.3 g of hydroxyethyl acrylate, 70.7 g of N-methylol methacrylamide, 47.8 g methacrylic acid, 573.6 g of methyl methacrylate, 398.3 g of styrene and 462 g of 2-ethylhexylacrylate were added to 978 g of de-ionized water containing 19.7 g of Eleminol JS-20 and 13.8 g of Polystep B-1. The resulting mixture was agitated for sufficient time until the formation of a stable pre-emulsion feed. The pre-emulsion feed was loaded into an addition funnel attached to the reaction flask and purged with nitrogen for 20 minutes. 150 g of the content was released into the flask in one portion. The temperature of the flask was held at 88° C. Separately, an initiator feed containing 7.9 g of ammonium persulfate in 169 g of water was prepared and loaded into the $2^{nd}$ addition funnel attached the reaction flask. After purged with nitrogen for 10 minutes, 60 g of the content was released into the flask in one portion. The temperature of the flask temperature was held steady at 88° C., and the remainder of the pre-emulsion feed and the initiator feed were fed concurrently to the flask over 100 minutes while temperature was held steady at 88° C. After completion of the feeds, temperature was held at 88° C. for an additional 60 minutes, and then cooled to 65° C. When temperature reached 65° C., a neutralization solution containing 40 g of ammonia in 176 g of de-ionized water was fed over 20 minutes and held at 65° C. for 180 minutes before allowing the flask to cool to room temperature. The resulting emulsion had a solid content of 35%.

Several additional polymers suitable as Polymeric Binder 1 are listed in Table 1 below.

TABLE 1

| Name | Polymer Type | Supplied by |
| --- | --- | --- |
| Baybond ® PU1810/1 | waterborne polyester based polyurethane polymer | Covestro Pittsburgh, PA |
| Takelac ® WS5000 | waterborne polyester based polyurethane polymer | Mitsui Chemicals Minato-ku, Tokyo Japan |
| VINNAPAS ® EN-1267 | Ethylene-Vinyl Acetate copolymer | Wacker Chemical Allentown, PA |
| VINNAPAS ® EN-421 | Ethylene-Vinyl Acetate copolymer | Wacker Chemical Allentown, PA |

Pigment Dispersion

Cyan Pigment Dispersion

A cyan dispersion was prepared according to procedure disclosed in U.S. Patent Application Publication No. 2012/0214939, the disclosure of which is incorporated by reference herewith for all purposes as if fully set forth. A cyan TRB2 pigment was employed, and the dispersant was cross-linked after dispersing the pigment.

Yellow Pigment Dispersion

A yellow dispersion was prepared in a similar fashion as the Cyan Dispersion with the exception of using yellow pigment PY155.

Magenta Pigment Dispersion

A magenta dispersion was prepared in a similar fashion as the Cyan Dispersion with the exception of using magenta pigment PR122.

Black Pigment Dispersion

A black dispersion was prepared in a similar fashion as the Cyan Dispersion with the exception of using carbon black pigment.

Disperse Dye Dispersion

Disperse dye dispersions were supplied by Diamond Dispersions Ltd. Sheffield, UK. Several disperse dye dispersions are listed below in Table 2.

TABLE 2

| Product name | Dye | Dye concentration |
| --- | --- | --- |
| DSC Blue359 | Disperse Blue 359 | 16% |
| DSM Plus Red60 | Disperse Red 60 | 16% |
| DSY Pro Yellow54 | Disperse Yellow 54 | 16% |
| DSK 40 Black Blend | Disperse Blue 360, Disperse Yellow 54, Disperse Brown 27 | 16% |

Disperse red dye dispersion, DSM Plus Red60, and Polymer Binder 1 were mixed and diluted with water based on the weight % in Table 3 below.

TABLE 3

| Component | Weight % |
| --- | --- |
| Polymer binder 1 | 10% (based on polymer dry weight) |
| DSM Plus red60 | 2% (based on dye dry weight) |
| De-ionized water | Balance to 100% |

The tested polymers included the Comparative Polymer, Polymer A, Polymer B and other Polymer Binder 1 listed in table 1. Each mixture of polymer and dye was coated on a woven 100% cotton Gildan T-shirt fabric using blow dot process. In the blow dot process, a circular image was created on the fabric by using a glass capillary tube, to pull up liquid solution. Pressurized air was then pointed at the piece of fabric at a measured distance of 10 cm. The filled capillary tube was placed in front of the air stream so that it blew the solution from the bottom of the capillary tube onto the fabric to create a circular image. The coated fabric was heat pressed with a STX20 transfer press manufactured by Stahls Hottronix, Carmichaels, PA, at 180° C. for 90 seconds. Colors were measured using an X-Rite colorimeter. Average color OD (Optical Density) from four repeated dots was obtained and listed in Table 4 below. The optical density results showed that Polymer Binder 1 is better than the comparative polymer or without any polymer when paired with DSM Plus Red 60.

TABLE 4

| Mixture of Polymer Binder 1 and DSM Plus Red 60 | Color OD (Optical Density) |
|---|---|
| None, DSM Plus Red60 only | 1.17 |
| Comparative polymer | 1.18 |
| Polymer A | 1.27 |
| Polymer B | 1.31 |
| Baybond ® PU1810/1 | 1.24 |
| Takelac ® WS5000 | 1.31 |
| VINNAPAS ® EN-1267 | 1.33 |
| VINNAPAS ® EN-421 | 1.32 |

Ink examples were made according to standard procedures in the inkjet art. As an example of ink preparation, an ink vehicle was prepared and added with stirring to an aqueous solution of Polymer Binder 1. After stirring until a homogeneous mixture was obtained, the solution was added to a colorant dispersion and stirred until a homogeneous ink mixture was obtained. Inks 1-4 and Comparative Inks 1-4 were thus prepared. The amounts of ingredients are listed in Table 5 below. Ingredient amounts are in weight percent based on the total weight of the final ink.

The fabrics used for printing included DELMAR-3272E, 100% cotton fabric supplied by Top Value Fabrics, Carson, CA; Stealth S/904, 100% polyester fabric for sports Tee supplied by Top Value Fabrics; and JETFLAG-L® 6050K, 100% polyester fabric supplied by Georg+Otto Friedrich, a Gross-Zimmern Germany. Before printing, the fabrics were sprayed with DuPont Artistri P5010 pretreatment solution. The pretreated fabric was heat pressed to dry using transfer press STX20 manufactured by Stahls' Hotronix, Carmichaels, PA for 90 seconds at 165° C. under medium pressure. The fabric was printed with the ink examples listed in Table 5 using a lab printing system. In this printing system, Ink was jetted from a mounted stationery Seiko (Tokyo, Japan) GS255 printhead onto the fabric held to the rotating cylinder underneath. A 4 inch by 8 inch solid color block with ink coverage about 12 g/m² was printed. The printed fabric was subsequently cured by moving through a tunnel dryer on a conveyor belt for 5 minutes at 165° C. The tunnel dryer was a DragonAir Fire™ 3611 manufactured by Brown Manufacturing, Wyoming, MI. Reflectance (%) and color were measured using an X-Rite colorimeter. L*, a*, b*, Chroma and Hue* were reported as the output. Color strength expressed by K/S value were calculated using the equation:

$$K/S = [\{(1-R)^2/2R\}]$$

where R is the reflectance %, K is absorbance and S is scattering.

Saturation, another color strength indicator for CMY color, were calculated using the equation:

$$\text{Saturation} = \text{Chroma}/L^*$$

TABLE 5

| Component | Ink 1 | Ink 2 | Ink 3 | Ink 4 | Comp. Ink 1 | Comp. Ink 2 | Comp. Ink 3 | Comp. Ink 4 |
|---|---|---|---|---|---|---|---|---|
| Polymer A | 5% | 5% | 5% | 5% | 10% | 10% | 10% | 10% |
| Takelac WS-5000 | 5% | 5% | 5% | 5% | | | | |
| Ethylene glycol | 3.70% | 3.70% | 3.70% | 3.70% | 3.70% | 3.70% | 3.70% | 3.70% |
| Surfynol 440 | 0.40% | 0.40% | 0.40% | 0.40% | 0.40% | 0.40% | 0.40% | 0.40% |
| Glycerol | 32.60% | 32.60% | 35.00% | 32.60% | 32.60% | 32.60% | 35.00% | 32.60% |
| Magenta Pigment dispersion | 2% | | | | 4% | | | |
| DSM Plus red60 dye | 2% | | | | | | | |
| Cyan Pigment Dispersion | | 2% | | | | 3.6% | | |
| DSC blue359 | | 1.6% | | | | | | |
| Yellow pigment dispersion | | | 2% | | | | 4% | |
| DSY Pro yellow54 dye | | | 1% | | | | | |
| Black pigment dispersion | | | | 3% | | | | 5% |
| DSK 40 black blend | | | | 2% | | | | |
| De-ionized water | Balance | Balance | Balance | Balance | Balance | Balance | Balance | Balance |

As shown in Tables 6-9 below, color data of Inks 1, 2, 3 and 4 containing blends of pigments and disperse dyes demonstrated higher color strength than comparative inks containing only pigment as colorant.

TABLE 6

Color data on DELMAR-3272 E Cotton, Untreated

| Ink | Color | L* | a* | b* | Chroma | Hue* | K/S | Saturation S = Chroma/L* |
|---|---|---|---|---|---|---|---|---|
| Ink 2 | Cyan | 51.05 | −9.40 | −33.04 | 34.36 | 254.11 | 4.46 | 0.67 |
| Ink 1 | Magenta | 45.92 | 50.69 | −9.51 | 51.57 | 349.37 | 6.22 | 1.12 |
| Ink 3 | Yellow | 87.71 | −1.85 | 78.51 | 78.53 | 91.35 | 6.92 | 0.90 |
| Ink 4 | Black | 34.40 | −1.66 | −0.76 | 1.84 | 203.95 | 5.61 | 0.05 |
| Comp. Ink 2 | Cyan | 55.62 | −16.47 | −35.73 | 39.34 | 245.25 | 3.89 | 0.71 |
| Comp. Ink 1 | Magenta | 55.88 | 46.15 | −7.37 | 46.74 | 350.92 | 3.02 | 0.84 |
| Comp. Ink 3 | Yellow | 89.15 | −4.10 | 74.05 | 74.17 | 93.17 | 4.12 | 0.83 |
| Comp. Ink 4 | Black | 40.25 | 0.28 | 1.75 | 1.77 | 81.05 | 3.94 | 0.04 |

TABLE 7

Color data on DELMAR-3272 E Cotton, Pretreated (P5010)

| Ink | Color | L* | a* | b* | Chroma | Hue* | K/S | Saturation S = Chroma/L* |
|---|---|---|---|---|---|---|---|---|
| Ink 2 | Cyan | 46.53 | −9.18 | −39.11 | 40.19 | 256.75 | 7.47 | 0.86 |
| Ink 1 | Magenta | 46.99 | 58.47 | 0.06 | 58.48 | 205.77 | 8.25 | 1.24 |
| Ink 3 | Yellow | 88.34 | −3.62 | 86.20 | 86.28 | 92.40 | 10.21 | 0.98 |
| Ink 4 | Black | 28.17 | −0.99 | 0.08 | 1.00 | 175.58 | 8.77 | 0.04 |
| Comp. Ink 2 | Cyan | 54.36 | −17.08 | −37.89 | 41.56 | 245.73 | 4.57 | 0.76 |
| Comp. Ink 1 | Magenta | 54.09 | 49.84 | −7.61 | 50.42 | 351.32 | 3.77 | 0.93 |
| Comp. Ink 3 | Yellow | 89.32 | −4.24 | 74.93 | 75.05 | 93.24 | 4.34 | 0.84 |
| Comp. Ink 4 | Black | 39.59 | 0.23 | 1.62 | 1.63 | 81.83 | 4.16 | 0.04 |

TABLE 8

Color data on JETFLAG-L 6050K, Pretreated (P5010)

| Ink | Color | L* | a* | b* | Chroma | Hue* | K/S | Saturation S = Chroma/L* |
|---|---|---|---|---|---|---|---|---|
| Ink 2 | Cyan | 45.06 | −7.95 | −43.31 | 44.04 | 259.59 | 9.17 | 0.98 |
| Ink 1 | Magenta | 48.83 | 60.38 | 4.57 | 60.55 | 4.33 | 8.33 | 1.24 |
| Ink 3 | Yellow | 86.98 | −4.21 | 86.93 | 87.03 | 92.77 | 10.29 | 1.00 |
| Ink 4 | Black | 28.06 | 0.69 | −0.65 | 0.96 | 316.93 | 10.52 | 0.03 |
| Comp. Ink 2 | Cyan | 57.32 | −14.81 | −38.25 | 41.02 | 248.83 | 5.30 | 0.72 |
| Comp. Ink 1 | Magenta | 55.63 | 48.38 | −12.40 | 49.94 | 345.62 | 4.64 | 0.90 |
| Comp. Ink 3 | Yellow | 88.27 | −4.72 | 67.19 | 67.36 | 94.02 | 7.47 | 0.76 |
| Comp. Ink 4 | Black | 36.69 | 0.82 | 0.34 | 0.89 | 22.42 | 9.55 | 0.02 |

TABLE 9

Color data on Stealth S/904, Pretreated (P5010)

| Ink | Color | L* | a* | b* | Chroma | Hue* | K/S | Saturation S = Chroma/L* |
|---|---|---|---|---|---|---|---|---|
| Ink 2 | Cyan | 44.41 | −8.02 | −42.87 | 43.62 | 259.40 | 10.50 | 0.98 |
| Ink 1 | Magenta | 47.05 | 62.57 | 3.41 | 62.67 | 3.12 | 10.97 | 1.33 |
| Ink 3 | Yellow | 87.43 | −3.11 | 93.19 | 93.24 | 91.91 | 14.80 | 1.07 |
| Ink 4 | Black | 24.28 | 0.81 | −1.68 | 1.87 | 295.93 | 12.50 | 0.08 |
| Comp. Ink 2 | Cyan | 55.18 | −14.28 | −38.55 | 41.11 | 249.67 | 4.03 | 0.74 |
| Comp. Ink 1 | Magenta | 54.71 | 47.79 | −9.42 | 48.71 | 348.84 | 3.37 | 0.89 |
| Comp. Ink 3 | Yellow | 88.85 | −4.06 | 71.19 | 71.31 | 93.26 | 5.88 | 0.80 |
| Comp. Ink 4 | Black | 36.11 | 0.68 | 0.61 | 0.92 | 41.60 | 7.19 | 0.03 |

What is claimed is:

1. An inkjet printing fluid set for printing on textile, the fluid set comprising:
    a) an aqueous pretreatment composition comprising an ink-aggregating agent and a non-ionic polymeric binder, wherein said ink-aggregating agent is one or more members selected from a cationic polymer, a multivalent metal salt, an organic acid, and mixtures thereof; and
    b) an aqueous inkjet ink comprising a colorant and a first polymeric binder,
    wherein the colorant is a mixture of a pigment, a disperse dye and a polymeric dispersant, the first polymeric binder is one or more members selected from the group consisting of acrylic emulsion polymer, styrene acrylic emulsion polymer, vinyl acetate-ethylene copolymer dispersion, and mixtures thereof, and wherein the weight ratio of the disperse dye to the pigment is from 1:20 to 20:1.

2. The fluid set of claim 1, wherein the pigment is a self-dispersing pigment.

3. The fluid set of claim 1, wherein said polymeric binder in b) is an acrylic emulsion polymer.

4. The fluid set of claim 3, wherein the non-ionic polymeric binder in a) is different from said first polymeric binder in b).

5. The fluid set of claim 4, wherein the polymeric dispersant in b) is different from said first polymeric binder in b) and the non-ionic polymeric binder in a).

6. The fluid set of claim 4, wherein the pigment is a self-dispersing pigment.

7. The fluid set of claim 1, wherein said disperse dye is selected from the group consisting of Disperse Blue 359, Disperse Red 60, Disperse Yellow 54, Disperse Blue 360, Disperse Yellow 54, and Disperse Brown 27.

8. A method of digital printing a textile fabric comprising:
    a) providing a textile substrate;
    b) applying a pretreatment composition comprising an ink-aggregating agent and a non-ionic polymeric binder, wherein said ink-aggregating agent is one or more members selected from a cationic polymer, a multivalent metal salt, an organic acid and mixtures thereof; and
    c) jetting an aqueous inkjet ink onto the textile substrate; wherein said aqueous inkjet ink comprises a colorant and a first polymeric binder, said colorant is a mixture of a pigment, a disperse dye and a polymeric dispersant, the first polymeric binder is one or more members selected from the group consisting of acrylic emulsion polymer, styrene acrylic emulsion polymer, vinyl acetate-ethylene copolymer dispersion, and mixtures thereof, and wherein the weight ratio of the disperse dye to the pigment is from 1:20 to 20:1.

9. The method of claim 8, wherein said polymeric dispersant is different from said first polymeric binder and said non-ionic polymeric binder.

* * * * *